(12) United States Patent
Lin et al.

(10) Patent No.: US 9,127,175 B2
(45) Date of Patent: Sep. 8, 2015

(54) COMPOSITE MICROPOWDER, CERAMIC PAINT, PROTECTIVE COATING, AND METHOD FOR MANUFACTURING COMPOSITE MICROPOWDER

(71) Applicant: Grand Tek Advance Material Science Co., Ltd., Taipei (TW)

(72) Inventors: Hseuh-Tso Lin, Hsinchu (TW); Shin-Hung Chen, Taipei (TW); Dick Zhong, Arcadia, CA (US)

(73) Assignee: Grand Tek Advance Material Science Co., Ltd., Taipei (TW)

( * ) Notice: Subject to any disclaimer, the term of this patent is extended or adjusted under 35 U.S.C. 154(b) by 191 days.

(21) Appl. No.: 14/013,662

(22) Filed: Aug. 29, 2013

(65) Prior Publication Data

US 2014/0220345 A1 Aug. 7, 2014

(30) Foreign Application Priority Data

Jul. 24, 2013 (TW) .............................. 102126409 A

(51) Int. Cl.
| | |
|---|---|
| *C09D 5/38* | (2006.01) |
| *C09D 5/03* | (2006.01) |
| *C08J 3/00* | (2006.01) |
| *C08J 3/12* | (2006.01) |
| *C09D 183/04* | (2006.01) |
| *C08L 83/04* | (2006.01) |
| *C09D 1/00* | (2006.01) |
| C08G 77/18 | (2006.01) |
| C08G 77/00 | (2006.01) |

(52) U.S. Cl.
CPC . *C09D 5/38* (2013.01); *C08J 3/005* (2013.01); *C08J 3/12* (2013.01); *C08J 3/126* (2013.01); *C08L 83/04* (2013.01); *C09D 1/00* (2013.01); *C09D 5/031* (2013.01); *C09D 183/04* (2013.01); *C08G 77/18* (2013.01); *C08G 77/80* (2013.01); *C08J 2300/102* (2013.01); *C08J 2327/18* (2013.01); *C08J 2483/04* (2013.01); *Y10T 428/2982* (2015.01); *Y10T 428/31663* (2015.04)

(58) Field of Classification Search
CPC .......... C07F 7/1836; C07F 7/12; C08L 83/04; C08L 27/18
See application file for complete search history.

(56) References Cited

U.S. PATENT DOCUMENTS

| | | | |
|---|---|---|---|
| 3,766,031 A | 10/1973 | Dillon | |
| 3,813,449 A | 5/1974 | Hartwimmer et al. | |
| 3,956,000 A | 5/1976 | Kuhls et al. | |
| 4,076,760 A | 2/1978 | Hartwimmer | |
| 5,641,571 A | 6/1997 | Mayer et al. | |
| 2008/0205950 A1* | 8/2008 | Moorlag et al. | 399/333 |

FOREIGN PATENT DOCUMENTS

| | | |
|---|---|---|
| EP | 0 253 400 A2 | 1/1988 |
| GB | 2 119 385 A | 11/1983 |

* cited by examiner

*Primary Examiner* — Kuo-Liang Peng
(74) *Attorney, Agent, or Firm* — Muncy, Geissler, Olds & Lowe, P.C.

(57) ABSTRACT

Disclosed is a method of forming a composite micropowder, including mixing 100 parts by weight of fluorine-containing polymer, 10 to 140 parts by weight of silane, catalyst, and water, such that the silane is in-situ polymerized in the fluorine-containing polymer to form a polysiloxane, and the fluorine-containing polymer and the polysiloxane form a composite. The composite is dried, and then physically crushed to form composite micropowder. The total weight of the fluorine-containing polymer and the silane and the weight of the catalyst have a ratio of 100:1 to 100:0.0001. The silane and the water have a molar ratio of 1:0.5 to 1:3. The composite micropowder has a diameter of 0.1 μm to 15 μm. The fluorine-containing polymer and the polysiloxane in the composite micropowder have a weight ratio of 95:5 to 60:40.

6 Claims, No Drawings

COMPOSITE MICROPOWDER, CERAMIC PAINT, PROTECTIVE COATING, AND METHOD FOR MANUFACTURING COMPOSITE MICROPOWDER

CROSS REFERENCE TO RELATED APPLICATIONS

This Application claims priority of Taiwan Patent Application No. 102126409, filed on Jul. 24, 2013, the entirety of which is incorporated by reference herein.

BACKGROUND

1. Technical Field

The disclosure relates to composite micropowder including fluorine-containing polymer, and in particular to the method and application thereof.

2. Description of the Related Art

Fluorine-containing polymers, especially polytetrofluoroethylene (PTFE), are the most chemically inert of all polymers. The fluorine-containing polymers have specific climate resistance, electrical insulation, low friction coefficients, and chemical resistance, thereby being widely applied in airlines, vehicles, petroleum, chemical engineering, and the like. Fluorine-containing polymer micropowders (especially PTFE micropowder) have a small diameter and enough softness to be evenly dispersed in other base materials to enhance those base materials' properties, e.g. lubricity, abrasion resistance, scratch resistance, releasing property, pollution resistance, flame retardancy, and hydrophobicity, and the like. As such, the major application of the fluorine-containing polymer micropowders is additive of other materials (e.g. paint). The PTFE micropowder has a smaller diameter, e.g. 4 μm to 10 μm, such that a paint with PTFE micropowder added may form a non-stick film with a smoother surface. In the paint system of polyether sulfone and polyphenylene sulfide, the PTFE micropowder is usually added into the paint for spray coating on a substrate. The paint is baked at a high temperature of 380° C. to 400° C. to have enough releasing ability, thereby being widely applied as the coating film of an automatic cooker. In addition, polychlorotrifluorothylene (PCTFE), tetrafluoroethylene-perfluoroalkylvinylether copolymer (PFA), tetrafluoroethylene-hexafluoropropylene copolymer (FEP), polyvinylidene difluoride (PVDF), tetrafluoroethylene-ethylene copolymer (ETFE), or ethylene-trifluorochloroethylene copolymer (ECTFE) has a diameter of 20 μm to 80 μm and excellent properties, thereby being usually applied as a powder coating.

Commercially available middle-coarse powder of fluorine-containing polymer such as PTFE has a diameter of about 70 μm to 260 μm. The commercially available fine powder of PTFE has a diameter of about 20 μm to 50 μm. The commercially available product directly added into the paint is easily aggregated and dispersed with difficulty, such that the paint properties are easily degraded or particles are formed on the coating film surface. Accordingly, the commercially powder should be further refined to reduce its diameter. Because PTFE has a low crystallinity and a low softening point, it is difficult to directly crush to ultra-fine the PTFE by a physical method. Next, the directly crushed PTFE powder has problems such as non-uniform diameter, poor flowability, large diameter, and the like.

The commercially available PTFE micropowder has a diameter of about 0.5 μm to 15 μm. The paint with added PTFE micropowder may form a coating film with an excellent smooth surface. The majority of methods of preparing PTFE micropowders can be a telomerization method, pyrolysis method, or radiation cracking method.

The telomerization method can be referenced in U.S. Pat. No. 5,641,571 and U.S. Pat. No. 3,956,000. The fluorine-containing polymer is first dispersion polymerized to form a dispersion liquid, and then aggregated and precipitated from the dispersion liquid to form micropowder. For example, the PTFE micropowder can be Dyneon™ PTFE TF-9201 and TF-9207 (diameter of 4 μm to 6 μm) commercially available from 3M Corporation. The telomerization method has multiple steps, and the micropowder product thereof has a low molecular weight (e.g. weight average molecular weight of about 200,000).

The pyrolysis method can be referenced in U.S. Pat. No. 3,813,449 and U.S. Pat. No. 4,076,760. The PTFE raw material is charged at a high temperature of 450 to 600 under a high pressure of 5×101.325 kPa to 10×101.325 kPa. The PTFE is pyrolyzed with shearing force and friction force to obtain a low molecular weight PTFE, which is then ground to obtain a PTFE micropowder. For example, the PTFE micropowder can be Dyneon™ PTFE TF-9205 (diameter of 8 μm) commercially available from 3M Corporation. However, the pyrolysis method consumes a lot of energy and produces a decomposition product with high toxicity.

The radiation cracking method can be referenced in U.S. Pat. No. 3,766,031, GB Pat. No. 2119385, and EP Pat. No. 0253400. The carbon chain of the PTFE is degraded by high-energy radiation such as γ-ray or E-beam to prepare a low molecular weight PTFE, which is then ground to obtain a PTFE micropowder with a diameter of 5 μm to 10 μm. For example, the PTFE micropowder can be Dyneon™ PTFE J14 (diameter of 6 μm) commercially available from 3M Corporation. However, the radiation cracking method requires specialized radiation equipment and incurs a high cost. In addition, the PTFE degraded by the radiation has a low molecular weight, thereby reducing its non-stick properties.

A ceramic paint is an aqueous inorganic paint with a major composition of nano inorganic compound dispersed in water. The ceramic paint is coated and then solidified by low-temperature heating, thereby obtaining a coating film similar to ceramic. The ceramic coating film has several advantages such as high thermal resistance, high hardness, climate resistance, and being environmentally friendly. The ceramic coating film is quickly applied in kitchenware due to its safety, but its non-stick properties cannot be sustained for along period. The non-stick properties of the ceramic paint come from silicon oil such as polydimethylsiloxane or hydroxypolydimethylsiloxane. However, the silicon oil in the ceramic paint gradually evaporates through cooking, such that the ceramic paint will lose its non-stick properties. Because a detergent for washing woks or pans is usually alkaline, the silicon oil on the coating surface and in the coating is easily washed out by the detersive at high temperatures in alkaline conditions. If a fluorine-containing polymer such as PTFE or PFA is added into the ceramic paint, the non-stick properties of the ceramic paint will be sustained for a long period. Moreover, defects such as being too soft, having insufficient abrasion resistance, and insufficient hot hardness of the fluorine-containing polymer (e.g. PTFE) film can be overcome, too. Compared to commercially available PTFE micropowder, the composite micropowder of PTFE and polysiloxane in the disclosure has better capabilities and non-stick properties for the ceramic paint.

BRIEF SUMMARY

One embodiment of the disclosure provides a method of forming a composite micropowder, comprising: mixing 100 parts by weight of fluorine-containing polymer, 10 to 140 parts by weight of silane, catalyst, and water, thereby in-situ polymerizing the silane in the fluorine-containing polymer to form a polysiloxane, wherein the fluorine-containing polymer and the polysiloxane form a composite; drying the composite; and physically crushing the composite to form a micropowder, wherein the total weight of the fluorine-containing poly or and the silane and the weight of the catalyst have a ratio of 100:0.1 to 100:0.0001; wherein the silane and the water have a molar ration of 1:0.5 to 1:3; wherein the composite micropowder has a diameter of 0.1 μm to 15 μm; and wherein the fluorine-containing polymer and the polysiloxane in the composite micropowder have a weight ratio of 95:5 to 60:40.

One embodiment of the disclosure provides a composite micropowder, comprising: a fluorine-containing polymer; and a polysiloxane, wherein the composite micropowder has a diameter of 0.1 μm to 15 μm; and wherein the fluorine-containing polymer and the polysiloxane have a weight ratio of 95:5 to 60:40.

One embodiment of the disclosure provides a ceramic paint, comprising: a mixture of 100 parts by weight of a silica sol, 50 to 100 parts by weight of a first organic silane, and 0.3 to 1 part by weight of catalyst, 10 to 20 parts by weight of silicon oil, and 10 to 50 parts by weight of the described composite micropowder.

One embodiment of the disclosure provides a protective coating, comprising: a ceramic primer on a substrate; and a ceramic finish coat on the ceramic primer, wherein the ceramic finish coat is the described ceramic paint.

A detailed description is given in the following embodiments with reference to the accompanying drawings.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

The composite micropowder of the disclosure has a diameter of 0.1 μm to 15 μm and excellent non-stick properties.

The disclosure also provides a method of preparing the composite micropowder. The method has several advantages such as simple processes free of pyrolysis or radiation cracking steps, being safe and environmentally friendly, and low cost.

In one embodiment, a method of preparing the composite micropowder includes evenly mixing 100 parts by weight of the fluorine-containing polymer and 10 to 140 parts by weight of silane. A suitable solvent can optionally be added to the mixture for soaking the fluorine-containing, polymer. The solvent which may soak the fluorine-containing polymer can be selected without any limitation. For example, the solvent may include alcohol, such as methanol, ethanol, or isopropyl alcohol, or benzene, such as toluene or xylene.

In one embodiment, 60% to 80% of the 10 to 140 parts by weight of the silane is further replaced by silica sol, silicate such as sodium silicate, or a combination thereof to further improve the thermal resistance of the composite. An overly high amount of the silica sol, silicate, or a combination thereof will influence the reaction rate of the silane in the fluorine-containing polymer, such that the silane is easily gelled during the hydrolysis condensation. The silane may impregnate into the pores of the fluorine-containing polymer, and then for a network of polysiloxane by a hydrolysis condensation (in-situ polymerization). As such, the aggregation of the fluorine-containing polymer can be prevented, thereby dispersing the fluorine-containing polymer. Otherwise, the polysiloxane may wrap the fluorine-containing polymer surface, such that the fluorine-containing polymer is cured to be easily crushed. An overly high amount of the silane will form too much polysiloxane in the composite micropowder, such that the fluorine-containing polymer properties will be lost. An overly low amount of the silane cannot form enough polysiloxane to wrap the fluorine-containing polymer, such that the fluorine-containing polymer cannot be efficiently dispersed. Moreover, the fluorine-containing polymer wrapped by insufficient polysiloxane is not brittle enough, which cannot be air-flow crushed to form the micropowder.

Subsequently, a catalyst is added to the mixture and evenly mixed, and water is then added to in-situ polymerize the silane in the fluorine-containing polymer to form a polysiloxane. The weight of the catalyst and the total weight of the fluorine-containing polymer and the silane have a ratio of 0.1:100 to 0.0001 to 100. The catalyst, which may catalyze the silane hydrolysis, can be selected without any limitations. For example, the catalyst includes sulfuric acid, hydrochloric acid, formic acid, acetic acid, citric acid, amine, potassium hydroxide, or sodium hydroxide. An overly high amount of the catalyst will cause an overly fast hydrolysis condensation to go out of control, such that the silane is easily gelled to form particles. An overly low amount of the catalyst will cause an overly slow hydrolysis condensation with an overly long reaction period. The water and the silane have a molar ratio of 0.5:1 to 3:1. An overly high amount of water will phase separate the reaction system. The silane will be remained by insufficient hydrolysis to degrade product properties due to an overly low amount of the water.

In one embodiment, the in-situ polymerization is performed at a temperature of room temperature (about 25° C.) to 45° C. for a period of 4 hours to 16 hours. The hydrolysis condensation of the silane will be controlled with difficulty by an overly high in-situ polymerization temperature and/or an overly long reaction period. The hydrolysis condensation of the silane cannot be sufficiently performed by an overly low in-situ polymerization temperature and/or an overly short reaction period.

In one embodiment, the fluorine-containing polymer is preferably a PTFE prepared by suspension polymerization or dispersion polymerization of tetrafluoroethylene (TFE), wherein the PTFE has a weight average molecular weight of 2,000,000 to 5,000,000 with better non-stick properties. The PTFE is preferably prepared by suspension polymerization due to being free of fluorine-containing surfactant and therefore free of PFOA. The PTFE may further include some copolymerizable monomer modifier to increase the film-formation ability during baking. The copolymerizable monomer modifier can be perfluoro olefin, especially hexafluoropropylene (HFP) or perfluoro(alkylvinyl)ether, especially a $C_{1-5}$ alkyl group, preferably perfluoro(propylvinyl)ether (PPVE) or perfluoro(methylvinyl)ether (PMVE). The amount of copolymerizable monomer is not sufficient to give PTFE melt-processability, and the copolymer is called modified PTFE. In general, the amount of copolymerizable monomer is less than 3 wt %, and preferably less than 1 wt %.

The fluorine-containing polymer can be a melt-processable homopolymer or a copolymer of a fluorine-containing olefin, a homopolymer or a copolymer of a hydrogenated fluorine-containing olefin such as PVDF or polyvinyl fluoride (PVF), a homopolymer or a copolymer of a chlorinated fluorine-containing olefin such as PCTFE or ECTFE, a copolymer of tetrafluoroethylene and fluorinated monomer, wherein the fluorinated monomer amount may influence the PTFE performance, or a copolymer of tetrafluoroethylene and olefin monomer. The preferable copolymerizable monomer for the TEE includes the perfluoro monomer, such as a $C_{3-6}$ perfluoro olefin and perfluoroalkylvinyl ether, wherein the alkyl group is a $C_{1-5}$ group, especially a $C_{1-3}$ group. The copolymerizable monomer preferably includes HFP, perfluoroethylvinylether (PEVE), perfluoropropylvinylether (PPVE), or perfluoromethylvinylether (PMVE). The TFE copolymer preferably includes tetrafluoroethylene-perfluoroalkylvinylether copolymer (TFE/PAVE, PFA), tetrafluoroethylene-hexafluoropropylene copolymer (TFE/HFP, FEP), tetrafluoroethylene-perfluoromethylvinylether copolymer (TFE/PMVE, MFA), or a copolymer of TFE and olefin monomer such as ethylene-tetrafluoroethylene copolymer (ethylene/TEE, ETFE).

The fluorine-containing polymer can be a powder or aggregation with a diameter of 20 µm to 260 µm. Note that the fluorine-containing polymer is totally free of the perfluorooctanic acid (PFOA).

In addition, the fluorine-containing polymer also includes a low molecular polymer. For example, a fluorine-containing polymer with a weight average molecular weight less than 2,000,000 can be used to prepare the composite micropowder in the disclosure.

In one embodiment, the silane has a chemical formula of $R^1_m R^2_n Si(OR^3)_{4-m-n}$, $R^4_j R^5_k SiCl_{4-j-k}$, or a combination thereof, wherein m, n, j, and k are independently 0 or a positive integer, $0 \le m+n \le 2$, and $0 \le j+k \le 3$, wherein $R^1$, $R^2$, $R^4$, and $R^5$ are independently a $C_{1-6}$ alkyl group (e.g. a methyl group, an ethyl group, a propyl group, or a butyl group), a $C_{3-6}$ cycloalkyl group (e.g. a cyclopentyl group or a cyclohexyl group), a $C_{2-6}$ alkenyl group (e.g. a ethylene group or a propylene group), an aromatic group (an aromatic group), a halogenated $C_{1-6}$ hydrocarbyl group (a chloromethyl group or a γ-chloropropyl group), an amino group (e.g. a γ-aminopropyl), a methylacryloxy group (e.g. a γ-methylacryloxy propyl group or a γ-glycidyl ether oxypropyl group), an epoxy group (e.g. 3,4-epoxycyclohexyl ethyl group), a hydrosulphonyl group (e.g. a γ-hydrosulphonyl propyl group), a sulphonyl group, a urea group (e.g. a γ-urea propyl), or an isocyanato group (e.g. a γ-isocyanatopropyl group). $R^3$ is a $C_{1-3}$ alkyl group such as a methyl group, an ethyl group, or a propyl group. In one embodiment, the silane can be methyltrimethoxy silane, methyltriethoxy silane, ethyl silicate, poly (ethyl silicate) such as TEOS-40, methyl silicate, γ-aminopropyltriethoxy silane, N-(β-aminoethyl)-γ-aminopropyltrimethoxy silane, 3-glycidyl ether oxypropyl trimethoxy silane, 2-(3,4-epoxycyclohexyl)ethyltrimethoxy silane, 3-(methyl methylacryloxy)propyltrimethoxy silane, γ-hydrosulphonylpropyltrimethoxy silane, γ-urea propyltriethoxy silane, γ-isocyanatopropyltriethoxy silane, tetrachloro silane, methyl trichloro silane, phenyl trichloro silane, methylphenyl dichloro silane, vinyl trichloro silane, or a combination thereof.

The mixture of the polysiloxane and the fluorine-containing polymer is then dried. For example, the mixture can be heated to remove the water thereof until no more water is dehydrated. The dried mixture is then filtered by a 100-mesh filter cloth to obtain a wet powder. The wet powder was dried at 150° C. to 300° C. for 0.5 hours to 4 hours to obtain a dry powder. The dry powder was weighted to obtain its silicon content. See following formula:

Polysiloxane%=[(dry powder weight−fluorine-containing polymer weight)/dry powder weight]×100%

Finally, the dry powder is physically crushed (e.g. using gas-flow crushing) to obtain the composite micropowder. The composite micropowder has a diameter of 0.1 µm to 15 µm, wherein the fluorine-containing polymer and the polysiloxane have a weight ratio of 95:5 to 60:40, and the fluorine-containing polymer in the composite micropowder has a weight average molecular weight substantially similar to that of the initial fluorine-containing polymer (before the in-situ polymerization of the silane). The physical crushing method such as gas-flow crushing only crushes the composite, rather than cracking the fluorine-containing polymer in the composite.

In one embodiment, the composite micropowder can be applied to a ceramic paint. The ceramic paint including the composite micropowder of PTFE and polysiloxane has an excellent adhesion, hot/cold hardness, abrasion resistance, and non-stick properties for a long period. The ceramic paint can be used as a ceramic finish, which has an excellent adhesion with a ceramic primer. The ceramic paint can be spray coated on the ceramic primer to form a protective coating with excellent non-stick properties for a long period. The protective coating has releasing and hydrophobic properties.

In one embodiment, the ceramic paint includes a mixture of 100 parts by weight of silica sol, 50 to 100 parts by weight of organic silane, and 0.3 to 1 parts by weight of a catalyst, 10 to 20 parts by weight of silicon oil, and 10 to 50 parts by weight of the composite micropowder.

The silica sol, defined as water soluble silica, provides silica particles in the ceramic paint to enhance the strength and hardness of the silicon ceramic network. In one embodiment, the silica sol has a solid content of 20% to 50%, and the solid has a particle diameter of 10 nm to 50 nm. The silica sol can be stabilized by sodium ions, stabilized by ammonium ions, or treated by alumina. A silica sol having an overly low solid content will make the ceramic paint contain too much water, such that the ceramic paint would be difficult to process and be easily blasted. A silica sol having an overly high solid content would not be stable, thus, large particles therein would be easily formed.

Organic silane can be methyltrimethoxy silane, methyltriethoxy silane, or a combination thereof. In one embodiment, the organic silane can be methyltrimethoxy silane. In addition, 5 to 10 parts by weight of another organic same such as tetramethoxy silane, tetraethoxy silane, dimethyldimethoxy silane, dimethyldiethoxy silane, phenyltrimethoxy silane, or a combination thereof may further tune the hardness of a coating formed of the ceramic paint. The organic silane may react with the silica sol to form a silica sol-gel. The coating formed of the ceramic paint with an overly high amount of the organic silane will condense too much in a baking process due to over dehydration (or removal of alcohol), such that the coating would chap or even peel easily. The coating formed of the ceramic paint with an overly low amount of the organic silane would make adherence to the ceramic primer difficult, making peeling more easy.

The catalyst can be formic acid, acetic acid, hydrochloric acid, citric acid, methyl formate, ethyl acetoacetate, maleic anhydride, phosphoric acid, or a combination thereof. The catalyst may accelerate the hydrolysis rate of the organic silane and the reaction between the hydrolyzed organic silane and the silica sol. The reaction of the organic silane and the silica sol will have a pH value of less than 4.0 with an overly high amount of the catalyst, and a pH value of higher than 6.5 with an overly low amount of the catalyst. The ceramic paint formed by the reaction with an overly high or overly low pH value may have non-brightness, poor adhesion to the ceramic primer, and even pulverization appearance.

In the disclosure, the silicon oil is hydroxy Silicon oil with a viscosity of 100 cps to 20000 cps at 25° C. for enhancing the non-stick properties of the coating. The silicon oil should not be poisonous, when in contact with food, if the intended use of the ceramic paint includes food contact.

In one embodiment, the ceramic paint may further include 20 to 60 parts by weight of a color powder to tune a color thereof for decoration. The color powder can be an inorganic color powder, such as a white powder of titanium oxide or zinc sulfide, a black powder of copper-chromium-manganese oxide, cobalt-iron-chromium oxide, copper-manganese oxide, manganese-iron oxide, or iron oxide, a yellow powder of titanium yellow or bismuth yellow, a green powder of cobalt green or chromium oxide, and blue powder of cobalt-chromium-aluminum oxide. The color powder can be used individually or be combined. The color powder should not be poisonous, when in contact with food, if the intended use of the ceramic paint includes food contact.

The ceramic paint is prepared as described below. Silica sol and color powder are mixed to grind for 6 hours. The composite micropowder is added to the ground mixture to grind for a further 2 hours, and then filtered by a 100-mesh strainer to form an Agent A. Organic silane, catalyst, and silicon oil were mixed to form an Agent B. The Agent A and the Agent B were ripened in a sealed container for 3 to 8 hours to form the ceramic paint.

A protective coating formed on a substrate includes a ceramic primer and a ceramic finish coat. The ceramic primer can be, but is not limited to being, commercially available or self-prepared. The ceramic finish coat is the described ceramic paint.

Common commercially available ceramic primers are composed of silica sol, color powder, functional ceramic powder, filler, silane, catalyst, and an auxiliary agent such as an anti-blasting agent, a leveling agent, and/or a rheological agent. A suitable solvent such as ethanol, isopropyl alcohol, ethylene glycol monobutylether, and the like can be further added to the ceramic primers if necessary. The ceramic primer formula tabulated in the example is a general ceramic primer formula.

In one embodiment, the protective coating is prepared as below. The ceramic primer is coated on a sandblasted, roughed, and degreased surface of a substrate, and the ceramic paint is then coated on the ceramic primer to form a ceramic finish coat. The substrate is then baked at 100° C. to 180° C. for 1 to 10 minutes, baked at 280° C. to 320° C. for 10 to 20 minutes, and then cooled at room temperature to complete the protective coating on the substrate. The substrate may resist at least 400° C., such as a non-metal substrate of glass or ceramic or a metal substrate of aluminum, aluminum alloy, anodic aluminum oxide, casting aluminum, casting iron, stainless steel, or carbon steel. The ceramic paint can be spray coated, dip coated, or roll coated on the ceramic primer.

The protective coating can be applied on kitchenware such as a wok, pan, fryer, automatic cooker, sandwich baking pan, cake pan, or grill, and on industry tools such as a thermal transfer, mold, conveyor belt, valve, snow shovel, or roller.

The ceramic paint has excellent hot hardness, cold hardness, corrosion resistance, and excellent adhesion to a ceramic primer. The ceramic paint has a long abrasion resistance period due to its surface hardness of 5H to 6H. The ceramic paint of the composite micropowder including fluorine-containing polymer is coated on the ceramic primer to form a ceramic finish coat for obtaining a protective coating, which has excellent non-stick properties for a long period. The composite micropowder including the fluorine-contain-ing polymer in the ceramic paint is free of PFOA, thereby being safe and environmentally friendly.

Below, exemplary embodiments will be described in detail with reference to the accompanying drawings so as to be easily realized by a person having ordinary knowledge of the art. The inventive concept may be embodied in various forms without being limited to the exemplary embodiments set forth herein. Descriptions of well-known parts are omitted for clarity, and like reference numerals refer to like elements throughout.

EXAMPLES

The names and sources of agents used in Examples and Comparative Examples are listed as below, but are not limited to:

(1) Fluorine-Containing Polymer Powder:

PTFE powder: CGM 031B (average diameter of 70 μm to 90 μm), CGM 031C (average diameter of 130 μm to 260 μm), and CGM 16(F) (average diameter of 25 μm) commercially available from Zhonghao Chenguang Research Institute of Chemical Industry Co. Ltd.

PFA powder: Hyflon® PFA P7010 (average diameter of 25 μm) commercially available from Solvay Solexis Corporation.

(2) Fluorine-Containing Polymer Micropowder:

PTFE micropowder: Dyneon™ PTFE TF 9207Z (average diameter of 4 μm) commercially available from 3M Corporation.

(3) Silicon Oil:

Silicon oil: XIAMETER® PMX-0156 (viscosity of 100 cps) commercially available from Dow Corning Corporation, Polymer FD 6 (viscosity of 6000 cps) and Polymer FD 20 (viscosity of 20000 cps) commercially available from Wacker Chemie AG.

(4) Ceramic Primer:

| Content | Parts by weight |
| --- | --- |
| Silica sol | 100 |
| Copper-manganese-iron oxide | 45 |
| Alumina | 50 |
| Silicon carbide | 12 |
| Ethylene Glycol Monobutyl Ether | 5 |
| Methyltrimethoxysilane | 90 |
| Formic acid | 0.6 |
| Silicon oil | 2.6 |
| Total | 305.2 |

Preparing the composite micropowder including fluorine-containing polymer are described in Examples 1 to 5.

Example 1

Composite Micropowder Including PTFE 1000 g of PTFE powder (CGM 031B) was added into a reaction vessel. A suitable amount of methanol was then added into the reaction vessel and stirred to completely soak the PTFE powder. 100 g of phenyltrimethoxy silane was then added into the reaction vessel and stirred evenly. 0.01 g of concentrated sulfuric acid to serve as a catalyst was then added into the reaction vessel and stirred evenly. 10 g of water was finally added into the reaction vessel. The mixture in the reaction vessel was reacted at a temperature less than 45° C. for a period of 4 hours.

The reaction result was heated to boil for removing the water thereof, and then filtered by a 100-mesh filter cloth to obtain a wet powder. The wet powder was dried at 150° C.; for 4 hours to obtain a dry powder (1053 g). The dry powder was gas-flow crushed and graded to obtain a composite micropowder including PTFE (diameter of 10 μm).

Example 2

Composite Micropowder Including PTFE 1000 g of PTFE powder (CGM 031C) was added into a reaction vessel. 300 g of phenyltrimethoxy silane and 600 g of sodium silicate were then added into the reaction vessel and stirred evenly 1 g of hydrochloric acid to serve as a catalyst was then added into the reaction vessel and stirred evenly. 120 g of water was finally added into the reaction vessel. The mixture in the reaction vessel was reacted at a temperature less than 45° C. for a period of 6 hours.

The reaction result was heated to boil for removing the water thereof, and then filtered by a 100-mesh filter cloth to obtain a powder. The wet powder was dried at 200° C. for 3 hours to obtain a dry powder (1430 g). The dry powder was gas-flow crushed and graded to obtain a composite micropowder including PTFE (diameter of 1 μm).

Example 3

Composite Micropowder Including PTFE 1.000 g of PTFE powder (CGM 16(F)) was added into a reaction vessel. 1400 g of meth ethoxy silane was then added into the reaction vessel and stirred evenly. 0.003 g of hydrochloric acid to serve as a catalyst was then added into the reaction vessel and stirred evenly. 550 g of water was finally added into the reaction vessel. The mixture in the reaction vessel was reacted at a temperature less than 45° C. for a period of 16 hours.

The reaction result was heated to boil for removing the water thereof, and then filtered by a 100-mesh filter cloth to obtain a wet powder. The wet powder was dried at 250° C. for 2 hours to obtain a dry powder (1667 g). The dry powder was gas-flow crushed and graded to obtain a composite micropowder including PTFE (diameter of 4 μm).

Example 4

Composite Micropowder Including PTFE 1000 g of PTFE powder (CGM 031B) was added into a reaction vessel. 550 g of ethyl silicate was then added into the reaction vessel and stirred evenly. 1.2 g of concentric sulfuric acid to serve as a catalyst was then added into the reaction vessel and stirred evenly. 95 g of water was finally added into the reaction vessel. The mixture in the reaction vessel was reacted at a temperature less than 45° C. for a period of 12 hours.

The reaction result was heated to boil for removing the water thereof, and then filtered by a 100-mesh filter cloth to obtain a wet powder. The wet powder was dried at 300° C. for 1 hour to obtain a dry powder (1250 g). The dry powder was gas-flow crushed and graded to obtain a composite micropowder including PTFE (diameter of 1.5 μm).

Example 5

Composite Micropowder Including PFA 1000 g of PFA powder (Hyflon® PFA P7010) was added into a reaction vessel. 400 g of phenyltrichloro silane was then added into the reaction vessel and stirred evenly, 1.4 g of hydrochloric acid to serve as a catalyst was then added into the reaction vessel and stirred evenly. 20 g of water was finally added into the reaction vessel. The mixture in the reaction vessel was reacted at a temperature less than 45° C. for a period of 8 hours.

The reaction result was heated to boil for removing the water thereof, and then filtered by a 100-mesh filter cloth to obtain a wet powder. The wet powder was dried at 300° C. for 0.5 hours to obtain a dry powder (1176 g). The dry powder was gas-flow crushed and graded to obtain a composite micropowder including PFA (diameter of 8 μm).

TABLE 1

|  |  | Example 1 | Example 2 | Example 3 | Example 4 | Example 5 |
|---|---|---|---|---|---|---|
| Fluorine-containing polymer | CGM 031B | 1000 | 0 | 0 | 1000 | 0 |
|  | CGM 031C | 0 | 1000 | 0 | 0 | 0 |
|  | CGM 16(F) | 0 | 0 | 1000 | 0 | 0 |
|  | Hyflon ® PFA P7010 | 0 | 0 | 0 | 0 | 1000 |
| Silane | Phenyltrimethoxy silane | 100 | 300 | 0 | 0 | 0 |
|  | Methyltrimethoxy silane | 0 | 0 | 1400 | 0 | 0 |
|  | Ethyl silicate | 0 | 0 | 0 | 550 | 0 |
|  | Phenyltrichloro silane | 0 | 0 | 0 | 0 | 400 |
|  | Sodium silicate | 0 | 600 | 0 | 0 | 0 |
| Water |  | 10 | 120 | 550 | 95 | 20 |
| Catalyst | Concentrated sulfuric acid | 0.01 | 0 | 0 | 1.2 | 0 |
|  | Hydrochloric acid | 0 | 1 | 0.003 | 0 | 1.4 |
| Polysiloxane amount (%) |  | 5 | 30 | 40 | 20 | 15 |
| Diameter (μm) |  | 10 | 1 | 4 | 15 | 8 |

Preparations of ceramic paints and protective coatings are described in Examples 6 to 11 and Comparative Examples 1 to 2.

Example 6

100 g of silica sol, 20 g of titanium oxide, and 10 g of copper-chromium-manganese oxide were mixed to grind for 6 hours. 20 g of the composite micropowder including PTFE in Example 1 was then added into the ground mixture to grind for a further 2 hours, and then filtered by a 100-mesh strainer to form an Agent A. 50 g of methyltrimethoxy silane, 0.3 g of formic acid, and 15 g of silicon oil (XIAMETER® PMX-0156) were mixed to form an Agent B. The Agent A and the Agent B were ripened in a sealed container for 3 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and be ceramic finish coat were baked at 100° C. for 10 minutes, then baked at 300° C. for 10 minutes, and then cooled to complete the protective coating.

Example 7

100 g of silica sol and 40 g of copper-chromium-manganese oxide were mixed to grind for 6 hours. 40 g of the composite micropowder including PTFE in Example 2 was then added into the ground mixture to grind for a further 2 hours, and then filtered by a 100-mesh strainer to form an Agent A. 70 g of methyltriethoxy silane, 1 g of formic acid, 5 g of silicon oil (XIAMETER® PMX-0156), and 5 g of silicon oil (Polymer FD 20) were mixed to form an Agent B. The Agent A and the Agent B were ripened in a sealed container for 8 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at 100° C. for 10 minutes, then baked at 300° C. for 10 minutes, and then cooled to complete the protective coating.

Example 8

100 g of silica sol and 45 g of copper-chromium-manganese oxide were mixed to grind for 6 hours, 10 g of the composite micropowder including PTFE in Example 3 was then added into the ground mixture to grind for a further 2 hours, and then filtered by a 100-mesh strainer to form an Agent A. 50 g of methyltrimethoxy silane, 15 g of methyltriethoxy silane, 0.8 g of acetic acid, and 20 g of silicon oil (XIAMETER® PMX0156) were mixed to form an Agent B. The Agent A and the Agent B were ripened in a sealed container for 3 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at 1.00° C. for 10 minutes, then baked at 300° C. for 10 minutes, and then cooled to complete the protective coating.

Example 9

100 g of silica sol, 15 g of titanium oxide, and 20 g of copper-chromium-manganese oxide were mixed to grind for 6 hours. 30 g of the composite micropowder including PTFE in Example 4 was then added into the ground mixture to grind for a further 2 hours, and then filtered by a 100-mesh strainer to form an Agent. A. 50 g of methyltrimethoxy silane, 5 g of phenyltrimethoxy silane, 0.6 g of acetic acid, and 15 g of silicon oil (Polymer FD 6) were mixed to form an Agent B. The Agent A and the Agent B were ripened in a sealed container for 3 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at loot for 10 minutes, then baked at 300° C. for 10 minutes, and then cooled to complete the protective coating.

Example 10

100 g of silica sol and 50 g of copper-chromium-manganese oxide were mixed to grind for 6 hours. 30 g of the composite micropowder including PFA in Example 5 was then added into the ground mixture to grind for a further 2 hours, and then filtered by a 100-mesh strainer to form an Agent A. 70 g of methyltrimethoxy silane, 10 g of phenyltrimethoxy silane, 0.8 g of acetic acid, and 15 g of silicon oil (Polymer FD 6) were mixed to form an Agent B. The Agent A and the Agent B were ripened in a sealed container for 3 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at 100° C. for 10 minutes, then baked at 300° C. for 10 minutes, and then cooled to complete the protective coating.

Example 11

100 g of silica sol, 20 g of titanium oxide, and 35 g of copper-chromium-manganese oxide were mixed to grind for 6 hours. 20 g of the composite micropowder including PTFE in Example 1 and 30 g of the composite micropowder including PFA in Example 5 were then added into the ground mixture to grind for a further 2 hours, and then filtered by a 100-mesh strainer to form an Agent A. 100 g of methyltrimethoxy silane, 1 g of acetic acid, and 10 g of silicon oil (XIAMETER® PMX-015) were mixed to form an Agent B. The Agent A and the Agent B were ripened in a sealed container for 3 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at 100° C. for 10 minutes, then baked at 300° C. for 10 minutes, and then cooled to complete the protective coating.

Comparative Example 1

100 g of silica sol, 20 g of titanium oxide, and 10 g of copper-chromium-manganese oxide were mixed to grind for 6 hours, and then filtered by a 100-mesh strainer to form an Agent A. 50 g of methyltrimethoxy silane and 0.3 g of acetic acid were mixed to form an Agent B. The Agent. A and the Agent B were ripened in a sealed container for 3 hours, and then evenly mixed with 15 g of silicon oil (XIAMETER® PMX-0156) to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at 100° C. for 10 minutes, then baked at 300° C. for 10 minutes, and then cooled to complete the protective coating.

Comparative Example 2

100 g of silica sol, 20 g of titanium oxide, and 10 g of copper-chromium-manganese oxide were mixed to grind for 6 hours. 20 g of the commercially available PTFE micropowder (Dyneon™ PTFE TF 9207Z) was then added into the ground mixture to grind for a further 2 hours, and then filtered by a 100-mesh strainer to form an Agent A. 50 g of methyltrimethoxy silane, 0.3 g of acetic acid, and 15 g of silicon oil (XIAMETER® PMX-0156) were mixed to form an Agent B. The Agent A and the Agent B were ripened in a sealed container for 3 hours to form a ceramic paint. The ceramic primer was spray coated on a sandblasted, roughed, and degreased surface of an iron wok, and the ceramic paint was then spray coated on the ceramic primer to form a ceramic finish coat. The ceramic primer and the ceramic finish coat were baked at 100° C. for 10 minutes, then baked at 300° C. for 10 minutes, and then cooled to complete the protective coating.

When the wok surface temperature reached 140° C. to 170° C., a fresh egg was cracked opened and then allowed to flow into the wok without adding any cooking oil made of vegetables or fat. After the egg white solidified (the wok surface temperature should not be higher than 210° C.), the egg was removed by a non-metal shovel. Finally, the wok surface was cleaned with a soft cloth and the absence of any egg being stuck on the k qualified it as being non-stick. The cycle was repeated until the egg stuck on the wok surface could not be cleaned with the soft cloth. The cycle numbers were counted and recorded.

TABLE 2

| | | Example 6 | Example 7 | Example 8 | Example 9 | Example 10 | Example 11 | Comparative Example 1 | Comparative Example 2 |
|---|---|---|---|---|---|---|---|---|---|
| Silica sol | | 100 | 100 | 100 | 100 | 100 | 100 | 100 | 100 |
| Silane | Methyltrimethoxy silane | 50 | 0 | 50 | 60 | 70 | 100 | 50 | 50 |
| | Methyltriethoxy silane | 0 | 70 | 15 | 0 | 0 | 0 | 0 | 0 |
| | Phenyltrimethoxy silane | 0 | 0 | 0 | 5 | 10 | 0 | 0 | 0 |
| Color powder | Titanium oxide | 20 | 0 | 0 | 15 | 0 | 20 | 20 | 20 |
| | Copper-chromium-manganese oxide | 10 | 40 | 45 | 20 | 50 | 35 | 10 | 10 |
| Composite including fluorine-containing polymer | Composite micropowder including PTFE (Example 1) | 20 | 0 | 0 | 0 | 0 | 20 | 0 | 0 |
| | Composite micropowder including PTFE (Example 2) | 0 | 40 | 0 | 0 | 0 | 0 | 0 | 0 |
| | Composite micropowder including PTFE (Example 3) | 0 | 0 | 10 | 0 | 0 | 0 | 0 | 0 |
| | Composite micropowder including PTFE (Example 4) | 0 | 0 | 0 | 30 | 0 | 0 | 0 | 0 |
| | Composite micropowder including PFA (Example 5) | 0 | 0 | 0 | 0 | 30 | 30 | 0 | 0 |
| Catalyst | Formic acid | 0.3 | 1 | 0 | 0 | 0 | 0 | 0.3 | 0.3 |
| | Acetic acid | 0 | 0 | 0.8 | 0.6 | 0.8 | 1 | 0 | 0 |
| Silicon oil | PMX-0156 | 15 | 5 | 20 | 0 | 0 | 10 | 15 | 15 |
| | Polymer FD 6 | 0 | 0 | 0 | 15 | 15 | 0 | 0 | 0 |
| | Polymer FD 20 | 0 | 5 | 0 | 0 | 0 | 0 | 0 | 0 |
| PTFE TF 9207Z | | 0 | 0 | 0 | 0 | 0 | 0 | 0 | 20 |
| Ceramic primer | | Yes | Yes | Yes | Yes | Yes | Yes | Yes | Yes |
| Properties | | | | | | | | | |
| Hardness | Cold | 6H | 6H | 7H | 7H | 7H | 5H | 9H | 6H |
| | Hot (180° C.) | 4H | 4H | 5H | 5H | 5H | 4H | 9H | 4H |
| | Hot (220° C.) | 3H | 3H | 4H | 4H | 4H | 3H | 9H | 3H |
| Non-stick test (cycle) | | 150 | 200 | 150 | 200 | 180 | 180 | 60 | 90 |

The properties of the protective coatings in Examples 6 to 11 and Comparative Examples 1 to 2 were tabulated as in Table 2. The properties of the protective coatings were measured as below:

(1) Coating Hardness Test

The hardness of the protective coatings was tested by the ASTM D 3363 standard.

(2) Non-Stick Test

The wok was heated by an electrical heating plate with a constant voltage 220V and an output power of 1000 W, and the wok surface temperature was measured by a surface thermometer (precision higher than or equal to 2.5 degrees).

As shown in Table 2, the protective coatings in Examples 6-11 had the cold hardness and the hot hardness higher than that of conventional aqueous PTFE coatings. The conventional PTFE non-stick coating has a cold hardness of 1H to 3H, and a hot hardness (at 220° C.) of F to H. The protective coatings in Examples 6-11 had non-stick properties for a longer period than the protective coatings in Comparative Examples 1 and 2.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of forming a composite micropowder, comprising:
mixing 100 parts by weight of fluorine-containing polymer, 10 to 140 parts by weight of silane, catalyst, and water, thereby in-situ polymerizing the silane in the fluorine-containing polymer to form a polysiloxane, wherein the fluorine-containing polymer and the polysiloxane form a composite;
drying the composite; and
physically crushing the composite to form a micropowder,
wherein the total weight of the fluorine-containing polymer and the silane and the weight of the catalyst have a ratio of 100:0.1 to 100:0.0001;
wherein the silane and the water have a molar ratio of 1:0.5 to 1:3;
wherein the composite micropowder has a diameter of 0.1 μm to 15 μm; and
wherein the fluorine-containing polymer and the polysiloxane in the composite micropowder have a weight ratio of 95:5 to 60:40.

2. The method as claimed in claim 1, wherein the fluorine-containing polymer comprises polytetrafluoroethylene with a weight average molecular weight of 2,000,000 to 5,000,000.

3. The method as claimed in claim 2, wherein the polytetrafluoroethylene further comprises a polymerizable monomer modifier.

4. The method as claimed in claim 1, wherein the fluorine-containing polymer comprises a homopolymer or a copolymer of a fluorine-containing olefin, a homopolymer or a copolymer of a hydrogenated fluorine-containing olefin, a homopolymer or a copolymer of a chlorinated fluorine-containing olefin, a copolymer of tetrafluoroethylene and fluorinated monomer, or a copolymer of tetrafluoroethylene and olefin monomer.

5. The method as claimed in claim 1, wherein the silane has a chemical formula of $R^1_m R^2_n Si(OR^3)_{4-m-n}$, $R^4_j R^5_k SiCl_{4-j-k}$, or a combination thereof, wherein m, n, j, and k are independently 0 or a positive integer, 0≤m+n≤2, and 0≤j+k≤3,
wherein $R^1$, $R^2$, $R^4$, and $R^5$ are independently H, a $C_{1-6}$ alkyl group, a $C_{3-6}$ cycloalkyl group, a $C_{2-6}$ alkenyl group, an aromatic group, a halogenated $C_{1-6}$ hydrocarbyl group, an amino group, a methylacryloxy group, an epoxy group, a hydrosulphonyl group, a sulphonyl group, a urea group, or an isocyanato group; and
$R^3$ is a $C_{1-3}$ alkyl group.

6. The method as claimed in claim 1, wherein the step of in-situ polymerizing the silane in the fluorine-containing polymer to form a polysiloxane is performed at a temperature of room temperature to 45° C. for a period of 4 hours to 16 hours.

* * * * *